United States Patent [19]
Kallman et al.

[11] Patent Number: 5,455,637
[45] Date of Patent: Oct. 3, 1995

[54] ELECTROCHROMIC EYEWEAR SYSTEM, RECHARGEABLE EYEWEAR AND EXTERNAL CHARGEER THEREFOR

[75] Inventors: William R. Kallman, Portland; Mark B. Roberts, Beaverton; David F. Baretich, Lake Oswego; Leonard M. Dorfman, Tigard; John F. Ahern, Beaverton, all of Oreg.

[73] Assignee: Comdisco, Inc., Rosemont, Ill.

[21] Appl. No.: 119,750

[22] Filed: Sep. 10, 1993

[51] Int. Cl.⁶ .................................................. G02C 7/10
[52] U.S. Cl. ................................ 351/44; 351/41; 351/158
[58] Field of Search .................................. 351/41, 44, 49, 351/158

[56] References Cited

U.S. PATENT DOCUMENTS

| | | |
|---|---|---|
| 3,683,168 | 8/1972 | Tatje . |
| 4,102,564 | 7/1978 | Michael ........................... 351/7 |
| 4,447,504 | 5/1984 | Goebel . |
| 4,449,799 | 5/1984 | Thoni . |
| 4,618,226 | 10/1986 | Sartor et al. . |
| 4,675,259 | 6/1987 | Totty . |
| 4,756,605 | 7/1988 | Okada et al. . |
| 4,770,954 | 9/1988 | Noordenbos . |
| 4,883,728 | 11/1989 | Witehira . |
| 4,904,078 | 2/1990 | Gorike ........................... 351/158 |
| 4,968,127 | 11/1990 | Russell et al. ..................... 351/44 |
| 4,977,899 | 12/1990 | Digby et al. . |
| 5,142,406 | 8/1992 | Lampert et al. . |

*Primary Examiner*—William L. Sikes
*Assistant Examiner*—Hung Xuan Dang
*Attorney, Agent, or Firm*—Kolisch Hartwell Dickinson McCormack & Heuser

[57] ABSTRACT

A power and control system for micro-electronics is described, as for lightweight, battery-powered electrochromic (EC) eyewear. Preferably such system includes a primary, lithium-type cell and a secondary, sealed lead acid-type cell in a hybrid, power-sharing configuration capable of supplying the low-energy, high-current (pulse) drain requirements of microelectronics, e.g. a switchable EC lens. A switch-mode power supply controller manages the power-sharing load on the hybrid battery system such that the secondary cell is charged by the primary cell. The system is capable of meeting short-term pulse drain requirements of switching EC lenses from clear to fully darkened at an acceptably fast rate and long-term operating life requirements of approximately 1500 cycles. The invented lead acid-type battery preferably is elongate, of uniform, right-rectangular cross section and provides over 20 mA-hours' capacity and the invented lithium-type battery preferably also is elongate, of uniform, right-rectangular cross section and provides over 180 mA-hours' capacity, all in a tiny volume compatible with one or more volume-restricted spaces. Preferably, the lithium-type and lead acid-type batteries are of approximately equal form factor and volume, for symmetric placement thereof in a void within either temple. The temples are hingedly connected with the eyewear's front piece via a unique leaf spring that biases the former into one of two orientations relative to the latter. Dual like-cell battery configurations also are disclosed, along with a flexible circuit defining one or more frame-mounted transmissivity switches. A microcontroller is described that fits within a tiny void formed in the eyewear's bridge. Finally an external, battery-powered battery charger case and circuit are described for use with EC eyewear powered by dual lead acid batteries.

11 Claims, 6 Drawing Sheets

ELECTROCHROMIC EYEWEAR SYSTEM, RECHARGEABLE EYEWEAR AND EXTERNAL CHARGEER THEREFOR

BACKGROUND AND SUMMARY OF THE INVENTION

The present invention relates generally to power and control systems for micro-electronics. More particularly, it concerns a battery, power management and control system therefor that features a high-power, long-life switching mode power supply compatible with various battery chemistries and an associated controller for supplying relatively short-term high-current switchable primary and relatively long-term low-current standby DC power in a volume-restricted space such as that of electrochromic (EC) eyewear. In a dual lead-acid battery configuration, an external battery, charger integral with an EC eyewear case is provided. The invention also involves a unique temple including a leaf spring hinge assembly and a protective temple tip coating useful for eyewear generally.

Currently available electrochromic (EC) eyewear is characterized by long transmissivity switching times, short operating (e.g. battery) life and a bulky frame that reduce its aesthetic appeal. The invention represents a broad-based approach to solving various problems with power supply and controller microelectronics to achieve greatly improved switching times, longer and more stable operation and consumer demands for more aesthetic and lightweight frames. It does so with various battery chemistries having form factors compatible with eyewear temples, with micro-miniaturized power supply and controller electronics having a form factor compatible with eyewear bridges, with signal distribution and switching via flex circuitry, with improved hinges connecting temples and eyewires, with lens-protective temple tip coatings and with an external battery charger case for convenient recharging of lead acid cells in one battery configuration.

Hybrid battery systems are not new. U.S. Pat. No. 4,770,954 describes a switching power supply having two battery types in a hybrid arrangement having their positive output terminals connected in parallel through common-cathode connected diodes to supply an output voltage alternatively from either a high-energy density source or a low-energy density source. The sources are said to be lithium-type and zinc-silver oxide-type. U.S. Pat. No. 4,977,899 describes a dual-battery system for use in lightweight, portable electrocardiograph (ECG) monitoring devices also have been proposed. A lithium battery provides reduced-voltage level to sustain a volatile read-and-write memory (RAM) device over the long life of the monitor while triple, series-connected replaceable/rechargeable alkaline batteries provide primary power to circuit elements for a short term of high-demand ECG data monitoring and recording. U.S. Pat. No. 4,883,728 describes a lead acid automotive battery that meets diverse current requirements by providing cells having different electrode thicknesses.

It has been determined that use of a primary cell alone cannot best meet certain pulse power drain demands placed, for example, on commercially available silver oxide "button" batteries (such as those used in watches and some pocket cameras) or lithium cells having a small form factor. This is because of high internal resistance in such batteries that leads to internal losses during pulse discharge, and the danger of damage when such batteries are over-driven.

The invention in a first embodiment solves this problem by using dual silver oxide batteries, in another by using dual lead acid batteries and in yet another by using dual lithium/thionyl chloride batteries. The invention in still another embodiment solves this problem by using the lower internal resistance of a lead acid cell secondary battery to provide the pulse rate requirements, while using a lithium-type cell primary battery to provide the needed capacity for long life. The invention in these various embodiments includes a controller that accommodates any of the various battery combinations and provides the needed switching currents and voltages to meet the demanding EC eyewear switching and lifetime requirements.

Briefly summarizing the merits of the various embodiments, the invented system preferably :includes a primary, lithium-type cell and a secondary, sealed lead acid cell in a hybrid, power-sharing configuration capable of supplying the relatively low-energy high-current (pulse) drain and relatively high-energy, low-current requirements, for example, of a switchable EC lens, while providing high operating cycle life and shelf life. A switch-mode power supply controller manages the power-sharing load on the hybrid batteries such that the secondary cell is charged by the primary cell. The system is capable of meeting the demanding EC short-term lens pulse drain requirements of approximately 60–130 milliamps (mA) for five to ten seconds (required to switch EC lenses from clear to fully darkened at an acceptably fast rate) and the long-term life requirements of over two thousand cycles. The invented lead acid battery provides approximately 12–15 mA-hours' capacity and the invented lithium-type battery provides nearly 180 mA-hours' capacity, all in a tiny volume of approximately one milliliter (1 ml) that is fittable, for example, within voids formed in either of the frame members of eyeglasses. Preferably, the lithium-type and lead acid-type batteries are of approximately equal form factor and volume, for symmetric placement thereof in such volume-restricted spaces.

In the dual lithium/thionyl chloride battery subsystem, a nominal 3.65 volts (3.65 V) output of the dual, parallel-connected lithium-type batteries (each approximately 35 mm long) is converted down to a maximum potential of 2.2 V at sufficiently higher current that rapidly switching the EC lenses is possible. In the dual lead acid battery subsystem, in which the batteries are connected in series, a nominal 4 V output of the batteries is used by a lens driver circuit to drive the EC lenses at a high switching current that characterizes the lead acid cells, and an external battery charger case provides for convenient, periodic recharging of the lead acid cells. In the dual or quad silver oxide battery subsystem, two to four batteries are operated in series and/or parallel nominally to supply 4 V at up to approximately $-150\ mA \leq I + 150\ mA$. Accordingly, the best characteristics of each of the cell types flexibly are accommodated in various form factors and with various lifetimes that are compatible with a wide range of EC eyewear and similarly demanding applications.

The invented system in its preferred embodiment thus integrates the better properties of lithium-type and lead acid-type cells in a hybrid arrangement that also avoids their known shortcomings. The invented system provides unprecedented long life via the primary cell and unprecedented high switching capacity via the secondary cell in an unprecedented small volume. This advantageous characteristic of the invented system in its preferred embodiment will be referred to herein as high energy density. In the alternative embodiments, the voltage/current characteristics and capacities of various paired cell-types are optimized for EC eyewear switching applications, some of them focused on extending useful battery life, others focused on avoiding battery recharge requirements, yet others focused on reducing battery replacement cost and still others focused on minimizing frame and temple size for aesthetic reasons.

Other aspects of the invention include the provision of a unique hinge assembly, including a leaf spring defining an inner wall of a forward region of the battery tubes, connecting the eyewear's eyewires and each temple. They also include the provision in at least an inner region of the temple tips of a polymeric material for protecting the EC lenses when the temples are folded. Finally, they include the provision of an external battery charger case for supporting the EC eyewear and for charging relatively short-lived batteries, e.g. a lead acid pair, without disassembly of the eyewear and with a ultra-low-power annunciator to apprise the EC eyewearer of the charging status.

These and additional objects and advantages of the present invention will be more readily understood after a consideration of the drawings and the detailed description of the preferred embodiment.

DETAILED DESCRIPTION OF THE PREFERRED EMBODIMENT

Figure 1:
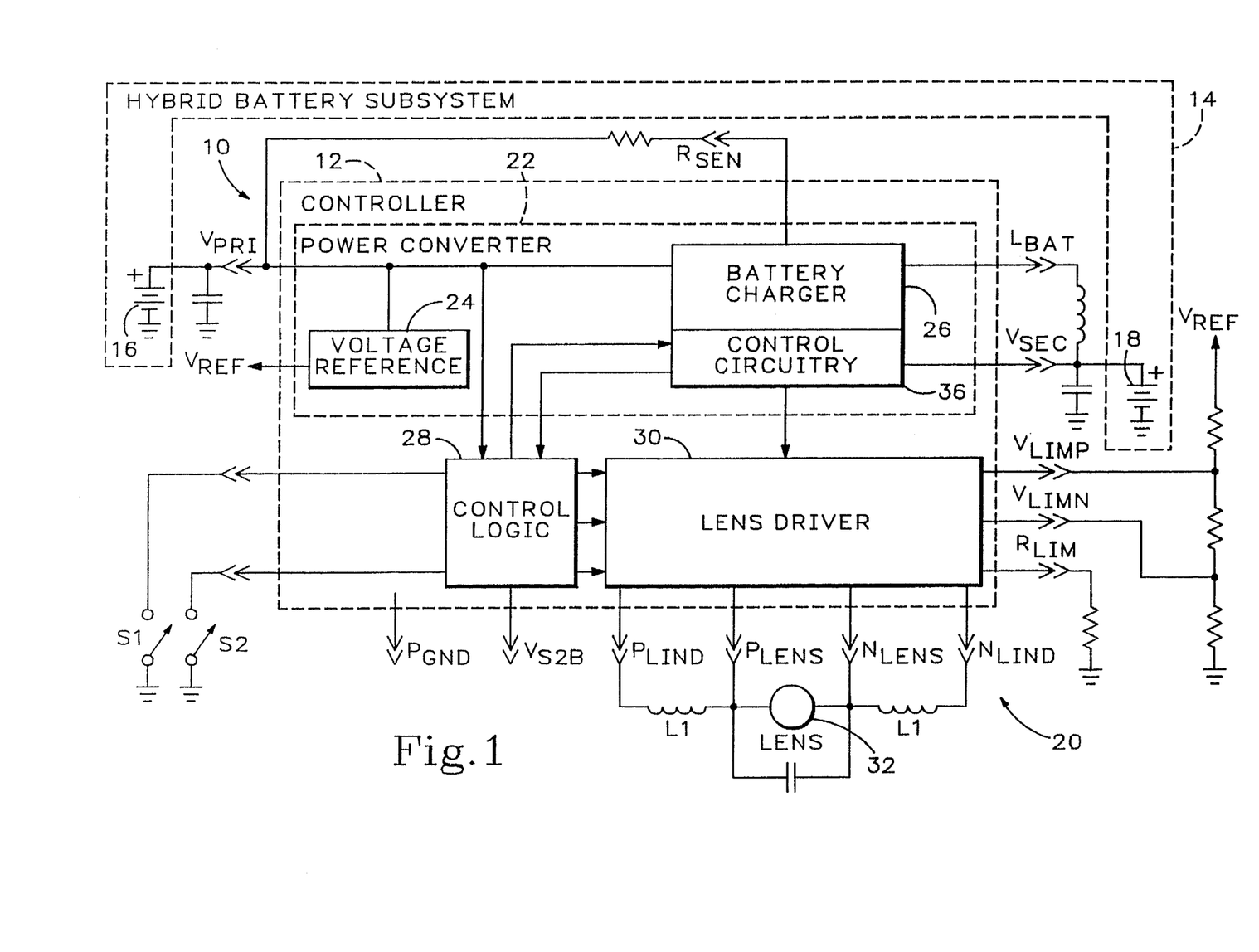
FIG. 1 is a system block diagram of the invented battery power supply made in accordance with its preferred embodiment, illustratively used in an EC lens converter circuit.

FIG. 1 schematically illustrates at 10 the invented power supply, or battery/power management, system for providing primary and secondary (back-up) DC power to microelectronics such as electrochromic (EC) eyewear. The use of system 10 is not limited to eyewear, of course, as will be appreciated by those skilled in the art. The invention is believed to be useful in any microelectronic application requiring relatively long-term low-current standby DC power and relatively short-term high-current switchable DC power in a volume-restricted space.

Power supply system 10 preferably includes a controller 12 and a hybrid battery subsystem 14 (indicated in dashed outline) including a first or primary battery 16 of a given cell type preferably including a lithium-type cell, e.g. one having a composition chosen preferably from lithium/thionyl chloride (LiSOCl$_2$) and lithium (poly-)carbon monofluoride ((CF)$_n$/Li), and a second or secondary battery 18 of a given cell type (different from the first cell type) preferably including a sealed lead acid-type cell. Primary and secondary batteries 16, 18 are operatively coupled by controller 12 and cooperate with one another in a hybrid arrangement to supply DC power to micro-electronic circuitry such as an EC lens converter indicated generally at 20.

Controller 12 preferably includes a switch-mode DC power converter, indicated in FIG. 1 generally at 22, which is powered by first battery 16 and which is capable of charging second battery 18. By its unique organization including controller 12 and hybrid battery subsystem 14, system 10 meets stringent operating characteristics including 1) low-energy, high-current (pulse) drain requirements of at least approximately 60–130 mA for 5–10 seconds (as required to switch EC lenses from clear to fully darkened at an acceptably fast rate) and 2) high-energy, low-current operating long life of greater than 6 months or approximately two thousand cycles and a shelf life of greater than approximately one and one-half years (as required of quality, durable EC eyewear).

It is believed that this unique combination of two battery chemistries best matches the requirements of high energy density and best achieves aesthetic demands of micro-electronic applications such as solid-state EC eyewear, yet is robust enough to provide both pulse discharge capability and overall power capacity needed to power micro-electronic applications such as EC eyewear lenses requiring fast, full color-switching times (under five seconds) and high, full color-switching cycle counts (more than fifteen hundred). The invention thus provides unprecedented switching rate and extended life, as contrasted with prior EC eyewear that manages full color switching in approximately fifteen seconds for only approximately three hundred cycles.

Power converter 22 may be seen from FIG. 1 preferably to include a voltage reference 24 and an internal battery charger 26, connected as indicated to primary and secondary batteries 16, 18. System 10 as used in the illustrated EC lens converter circuit may be seen preferably to include control logic 28 and a preferably switch-mode lens driver 30 connected as indicated to at least one EC lens 32 (illustrated only schematically in FIG. 1) that may be mounted within an eyewear frame (not shown in FIG. 1, but shown in FIG. 4).

It will be understood by those skilled in the art that lens 32, like its companion, mirror-image, lens 34 (not shown in FIG. 1, but shown in FIG. 4), is capable of switching its visible light transmissivity, e.g. at least its transmissivity of light energy, within the visible frequency spectrum, that is incident thereon, between approximately 15% transmissivity (referred to herein as a darkened condition of the lens) and approximately 70% transmissivity (referred to herein as a clear or bleached condition of the lens). It will be appreciated that ultraviolet and other harmful, near-visible light components preferably are filtered by conventional means such as coating the EC lens. Thus, the invention provides the EC eyewearer with constant protection, as well as with manually operable and thus selective comfort. Switching is accomplished by the operation of one or more switches such as manually operable switches S1, S2.

Various dual like-cell battery configurations are contemplated by the invention, as alternatives to the hybrid-cell configuration described and illustrated in detail herein. For example, it has been discovered that four silver oxide batteries such as those used in electronic wristwatch and camera applications may be used to supply switching current to EC lenses 32, 34. Alternatively, dual lead acid cells may be used, although such require frequent recharging, as will be described in detail below. In such dual, like-cell battery subsystems, form factors similar to that described above in reference to the hybrid-cell battery subsystem are preferred, with like electro-mechanical temple tubing encasing, end capping and flex circuit interconnecting, as will be described in detail below.

It will be appreciated that, in accordance with the preferred embodiment of the invention, two frame-mounted switches S1, S2 are provided for manual switching of both EC lenses between their bleached (high-transmissivity) and darkened (low-transmissivity) states. In such embodiment, momentary closure of one of normally-open push-button switches S1, S2 causes the lenses progressively to darken until the switch is released, and momentary closure of the other of switches S1, S2 causes the lenses progressively to bleach until such other switch is released. If both of switches S1, S2 are depressed at once, the lenses progressively bleach until the switches are released.

It will be understood from FIG. 1 that switches S1, S2 are logic-level switches that are electrically connected to logic inputs of control logic 28, which switches simply ground otherwise high-logic level signals to indicate to control logic 28 that the user of the EC eyewear intends to change the transmissivity of its lenses. Thus, references herein to the connection of switches S1, S2 between controller 12 and lenses 32, 34 will be understood to refer to an operative, rather than a physical, connection therebetween. Advantageously, this use of logic level switching, rather than of relatively higher-current switching of lenses 32, 34 by lens driver 30, renders it possible to use tiny-volume membrane switches activated by tiny frame-mounted push buttons, as will be described.

Those skilled in the art will appreciate that coded or uncoded plural-switch operations alternatively may be used, within the spirit and scope of the invention. For example, a single switch might be scanned and its closure and/or cycle time measured such that the timing and/or rate of closure determines the desired switching operation, as is known in the field of wristwatches and other micro-electronics applications.

EC lenses 32, 34 may be of any known composition and lay-up compatible with the electro-mechanical configurations of the disclosed lens converter and eyewear frame. Illustratively, lenses 32, 34 may be formed from laminar glass substrates, and may have active layers therein capable of producing, upon the application of a DC potential at the lenses' edges, a desired change in transmissivity of near-visible light. U.S. Pat. No. 5,142,406 entitled ELECTROCHROMIC OPTICAL SWITCHING DEVICE and issued Aug. 25, 1992, with which familiarity is assumed, describes one such EC device and its operation. EC lens edge layer contact and isolation may be accomplished as taught therein or by any suitable method, e.g. via the selective application of a conductive composition such as gold ink to a peripheral edge region of lenses 32, 34. Protective layers providing ultraviolet screening and reducing visible light reflection may be used, without departing from the spirit and scope of the invention.

An EC lens behaves somewhat like a large capacitor that is chargeable to a desired voltage level at which it passively remains for as long as the voltage between its electrodes is maintained. This charge-maintaining capacity is due primarily to relatively low lens leakage currents, which may be as small as approximately 1 μA. Those skilled in the art will appreciate that the choices of materials, processes, coating thicknesses, etc. affect such EC lens performance characteristics, including series capacitance and resistance, leakage current, switching time, transmissivity range, stability and life expectancy.

The discrete devices and the voltage reference shown in FIG. 1 are believed to be readily understood by those of skill in the art, and may be of any conventional design compatible with large-scale integration. Thus, for the sake of brevity, they are not described in detail herein. The control logic and lens driver shown in FIG. 1 will be understood by those of skill in the art in detail by the description of the operation of switches S1, S2, and internal battery charger 26. It will be appreciated that lens driver 30 preferably is implemented as a switch-mode DC power converter that may be quite similar to the switch-mode DC power converter implementation of internal BATTERY CHARGER 26 to be described below.

Briefly summarizing the operation of power supply system 10 by reference to the functional blocks of FIG. 1, the illustrated signals will be described by reference to their signatures. $V_{PRI}$ and $V_{SEC}$ represent the positive terminals, respectively, of primary and secondary batteries 16 and 18, suitably decoupled by corresponding external capacitors, as shown. $V_{REF}$ represents a stable voltage level established by VOLTAGE REFERENCE 24 as a function of $V_{PRI}$. $V_{REF}$ is divided down by three series-connected external resistors to produce $V_{LIMP}$ (a positive voltage reference level) and $V_{LIMN}$ (a negative voltage reference level) that are used by LENS DRIVER 30 to establish, respectively, the maximum and minimum operating voltages of lenses 32, 34. Another external resistor is used to establish $R_{LIM}$, which sets a current limit for LENS DRIVER 30. A precision external resistor is connected to $V_{PRI}$ to define $R_{SEN}$, a signal used by internal BATTERY CHARGER 26 as a current limit in the hybrid battery subsystem configuration of invented power supply 10.

$P_{GND}$ represents a ground reference for the preferred tile array implementation of controller 12. $V_{S2B}$ represents a secondary battery voltage-sense signal that essentially enables CONTROL LOGIC 28 to turn off LENS DRIVER 30 if either lead acid battery of hybrid battery subsystem 14 exhibits an under-voltage condition. $L_{BAT}$ is produced by internal BATTERY CHARGER 26 in hybrid battery system configurations that include a lithium-type cell and is connected to $V_{SEC}$ via an external inductor, as shown. Such external inductor, it will be understood, may be fitted within a corner block of the frame of eyewear 38, as will be described by reference to FIGS. 4 and 4A.

Finally, $P_{LIND}$ and $P_{LENS}$ are produced by LENS DRIVER 30 for the respective drive and sense connections via one of the windings of dual-wound inductor L1 with the lenses' positive electrodes, and $N_{LIND}$ and $N_{LENS}$ are produced by LENS DRIVER 30 for the respective drive and sense connections via the other winding of dual-wound inductor L1 with the lenses' the negative electrodes. Those of skill in the art will appreciate that one or more lenses such as lenses 32, 34 connected in parallel with one another and with an external filter capacitor may be so driven by LENS DRIVER 30.

Internal BATTERY CHARGER 26 may be seen to form a part of what is referred to herein as a switch-mode DC power supply, or converter, 22. BATTERY CHARGER 26 also may be seen to be operatively coupled with CONTROL LOGIC 28 and CONTROL CIRCUITRY, indicated generally at 36, thereby efficiently to transfer power from the secondary cell to EC lens 32 and to act as a battery charger to trickle recharge secondary battery 18 from primary battery 16. CONTROL CIRCUITRY 36 also cooperates with control logic 28 to manage the color-switching control of the EC lens by way of LENS DRIVER 30 and switches S1, S2. Those of skill in the art will appreciate that CONTROL CIRCUITRY 36 thus operates selectively to supply power from the charger to the battery subsystem.

Preferably, the power supply within battery charger 26 is a current-limiting, step-down, or 'buck', switching regulator that operates discontinuously. In other words, the power supply of charger 26 operates only when the EC lenses are not being charged by the control circuitry, e.g. lens driver 30. Also, the power supply stops charging the batteries when the charge voltage reaches nominally 2.26 V. The power supply accepts input voltages within the range between 2.6 V and 4.4 V, thereby rendering it compatible with the various battery configurations described herein. The power supply's output current into a secondary, e.g. lead-acid cell, battery is approximately 500 µA at 2.25 V and 25° C. The external output inductor shown in FIG. 1 is preferably approximately 750 µH, and may exhibit a series resistance as high as approximately 25 Ω. Importantly, the power supply's efficiency is greater than approximately 70–80%, as measured with a primary battery voltage of 3.5 V and secondary battery voltage of 2.2 V.

Lens driver 30 preferably acts as a constant-current source, with voltage limits compatible with charging an EC lens such as lenses 32, 24 to a desired voltage level representing a desired visible-light transmissivity. Preferably, lens driver 30 is implemented as a four-quadrant switching power converter including quad, full-bridge configured output transistors providing bidirectional current flow and low voltage drop in either direction. The preferred implementation of lens driver 30 employs at its output a dual wound differential inductor L1 that forms a part of an L-C output filter (for producing a smooth output waveform and preferably approximately smooth, linear switching operation of EC lenses 32, 34).

In accordance with the preferred embodiment of the invention, bipolar complementary metal oxide semiconductor (BICMOS) is used to implement the power supply and control circuitry functions described herein in what is referred to in the chip design field as a tile array. Such a low on-resistance semiconductor fabrication process provides the desired design flexibility, tiny volume, low power, long life, cool operation and stable operation that is demanded by many micro-electronic applications including quality EC eyewear. Those of skill in the art will appreciate that alternative circuit and chip design and fabrication processes may be used, so long as they are capable of achieving the desired functional density that is required in meeting the aesthetic demands of eyewear consumers.

Those of skill in the art will appreciate that such control circuitry may in alternative embodiments include internally masked or externally programmable logic or jumpers that determine what battery configuration is present and provides the suitable charging current and voltage via BATTERY CHARGER 26 to the battery subsystem when lens driver 30 is inoperative, i.e. when the batteries are not being used to switch or power EC lenses 32, 34. It will be appreciated that such external resistors, as well as other external components, may be integrated along with their associated power supply and control circuitry, thus further to reduce circuitry volume and further to increase functional density.

The invented hybrid-battery power supply may be described, for use in EC eyewear, as including first and second batteries 16, 18 having a lithium-type cell and a lead acid-type cell, respectively, and controller 12 for operatively connecting the same to one another and to EC lens 32. Controller 12 preferably includes switch-mode power converter 22 that, powered by first battery 16, is capable of charging second battery 18. Controller 12 may be seen from FIG. 1 to be responsive, while being powered by first battery 16, to one or more manually operable switches S1, S2 connected with the EC eyewear to supply power from second battery 18 to EC lens 32 via lens driver 30. Persons skilled in the art will appreciate that the invented hybrid-battery power supply lends itself to numerous alternative applications, all within the spirit and scope of the invention.

Figure 2:
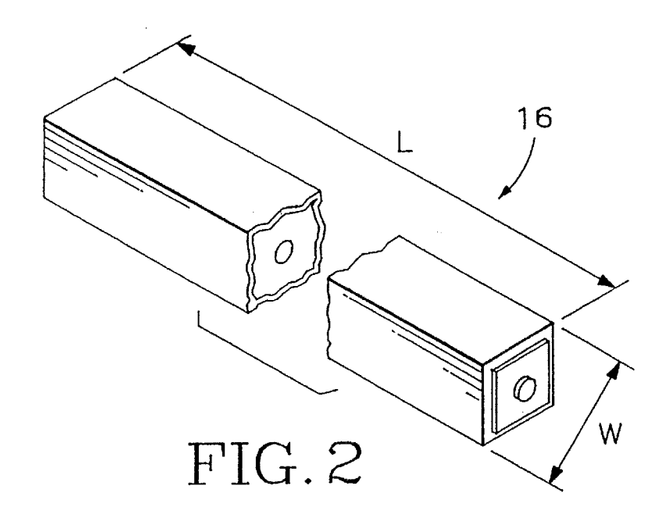
FIG. 2 is a cross-sectional plan view of one of the batteries of the hybrid battery subsystem.

FIG. 2 shows primary battery 16 in a cross-sectional plan view that illustrates its advantageous form factor and functional density. Primary battery 16 preferably takes the form of a lithium-type cell that provides at least approximately 200 mA-hours' energy capacity, which satisfies the long cycle or operating life requirement, e.g. more than approximately six months, and the long shelf life, e.g. more than approximately one and one-half years, of EC eyewear and similarly demanding micro-electronic applications. Primary lithium thionyl chloride battery 16 occupies a volume preferably of less than approximately 1.0 ml, more preferably of less than approximately 0.8 ml and most preferably less than approximately 0.65 ml. Such a tiny volume is achieved by the illustrated chemistry, cell and electrodes configuration, and preferably battery 16 is housed in a substantially sealed, preferably metal, canister.

It may be seen from FIG. 2 that primary lithium thionyl chloride battery 16 preferably is elongate and of generally uniform, e.g. rectilinear and more preferably right-rectangular, cross section. It also may be seen that primary battery 16 preferably has a length (L)-to-width (W) ratio of at least approximately 5:1, more preferably at least approximately 7:1 and most preferably at least approximately 8:1.

Figure 3:
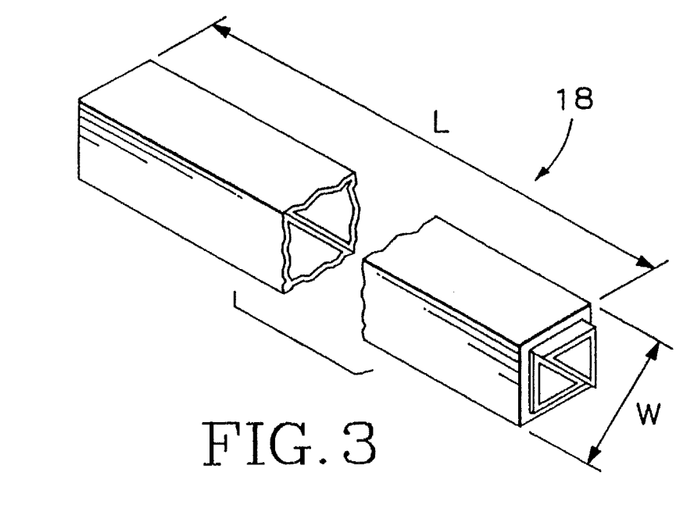
FIG. 3 is a cross-sectional plan view of the other of the batteries of the hybrid battery subsystem.

FIG. 3 shows secondary battery 18 in a cross-sectional plan view that similarly illustrates its advantageous form factor and functional density. Secondary battery 18 takes the form of a lead acid cell that provides at least approximately 10–20 mA-hours' energy capacity, while also meeting the long operating and life requirements of, for example, EC eyewear. Secondary lead acid battery 18 occupies a volume preferably of less than approximately 1.0 ml, more preferably of less than approximately 0.8 ml and most preferably less than approximately 0.65 ml. Such a tiny volume is achieved by the illustrated chemistry, cell and electrodes configuration, and preferably battery 18 is housed in a substantially sealed, preferably metal canister.

It may be seen from FIG. 3 that secondary lead acid battery 18 preferably is elongate and of generally uniform, e.g. rectilinear and more preferably right-rectangular, cross section. It also may be seen that, like primary battery 16, secondary battery 18 preferably has a length (L)-to-width (W) ratio of at least approximately 5:1, more preferably at least approximately 7:1 and most preferably at least approximately 8:1. Importantly, secondary lead acid battery 18 has a pulse current capacity of at least approximately 60–130 mA for at least approximately 3–5 seconds, and preferably for at least approximately 10–15 seconds, i.e. long enough to fully color switch the EC lenses.

This battery characteristic uniquely achieves the high pulse current drain requirements of EC eyewear and similarly demanding applications wherein user-responsiveness to switching the state of the micro-electronics must be relatively fast, e.g. no more than approximately 5–15 seconds. Those of skill in the art will appreciate that it is preferable to provide EC eyewear having a substantially symmetric switching time, whether from bleached to dark or dark to bleached. While prior EC eyewear may achieve relatively short, e.g. approximately 5 second, switching times from bleached to dark, they require much longer, e.g.

approximately 15 second, switching times from dark to bleached. The present invention achieves substantially symmetric, and relatively shorter, e.g. approximately 5–10 second, full color-switching times, regardless of the starting state of the EC lenses.

Figure 4:
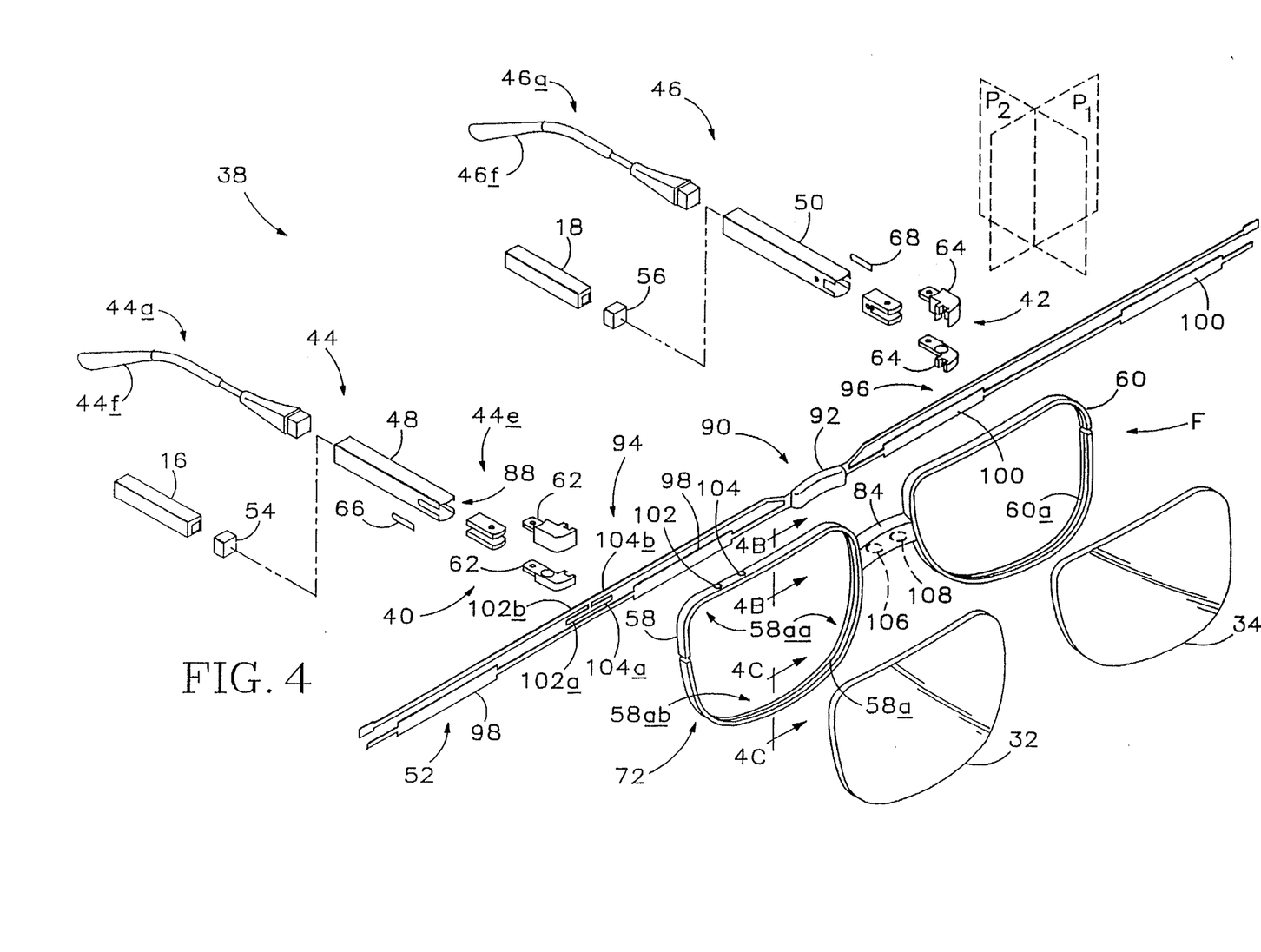
FIGS. 4 and 4A are isometrical views of the hybrid battery subsystem of FIG. 1, further including the invented controller, switch and interconnect components, all fitted within a frame of a pair of eyeglasses.

FIG. 4 shows the illustrated application of the invented system whereby, in accordance with the preferred embodiment thereof, the tiny volume that has been achieved is approximately 4 mm×4 mm×40 mm=640 mm³ each for the hybrid, lithium and lead acid battery packages for a total volume of slightly over 1 ml for the illustrative EC eyewear application. It may be seen from FIG. 4 that the form factors of first and second batteries 16, 18 preferably are approximately equal, and that the first and second batteries occupy volumes that are approximately equal to one another. Such lends the invented hybrid battery subsystem to applications such as EC eyewear in which extremely limited space is available and in which such limited space is approximately equally divided. It also may seen that, for such eyewear applications, first and second batteries 16, 18 also preferably are substantially symmetrically located within either temple of the eyewear, thus freeing other areas of the eyewear for other micro-electronics such as controller 12, control logic 28 and lens driver 30.

Summarizing now, by reference still to FIG. 4, the invented EC eyewear, indicated generally at 38, may be seen preferably to include an eyewear frame such as eyeglass frame F; an EC lens such as lens 32 and/or lens 34 mounted therein, with the lens being capable of switching its visible light transmissivity; one or more switches such as manually operable switches S1, S2 also preferably mounted therein, with at least one of the switches being operatively connected to the lens; and a power supply such as hybrid battery power supply 10 preferably contained within the frame. Such power supply preferably includes a controller such as controller 12; a first battery such as primary lithium-type battery 16 for supplying standby current to the controller; and a second battery such as secondary lead acid-type battery 18 for supplying switching current through the connected switch to the lens. Preferably, the controller includes a switch-mode power converter such as power converter 22 capable of charging the second battery, as described and illustrated herein.

It may be seen from FIG. 4 that first and second batteries of whatever cell type, in accordance with the preferred embodiment of the invention, are symmetrically located on either side of frame F immediately behind lateral hinge assemblies 40, 42 that connect their respective temples 44, 46 to frame F. For aesthetic and safety reasons, each battery is enclosed within a battery sleeve or tube such as mirror image tubes 48, 50. Each battery is sealed within its respective tube, and is electrically connected to a flex circuit 52 by a battery tube end cap such as end caps 54, 56, which provide sealing enclosure of the batteries to prevent leakage from reaching the exterior of the eyewear and to prevent moisture from reaching the interior thereof. One suitable means for sealing lead-acid batteries within battery tubes involves the use of a metal-filled, e.g. lead-filled, polymer glue as a sealant.

A unique feature of invented EC eyewear 38 is applicable not only to EC eyewear, but is believed to be useful in eyewear applications generally. Invented hinge assemblies 40, 42 preferably are provided hingedly to connect rearwardly extending temples 44, 46 with laterally spaced regions of dual eyewires 58, 60 such that the eyewear, e.g. EC eyewear 38, easily and conveniently can be deployed and stowed. Mirror-image hinge assemblies 40, 42 include first hinge members 62, 64 projecting rearwardly from a lateral region, or corner block, of a corresponding eyewire such as bridge-connected eyewires 58, 60, and a hingedly matable forward terminal end of a corresponding temple such as temples 44, 46, with interleaving fingers thereof being pivotally securable by a pin extending through aligned holes thereof, as is known.

Figure 4A:
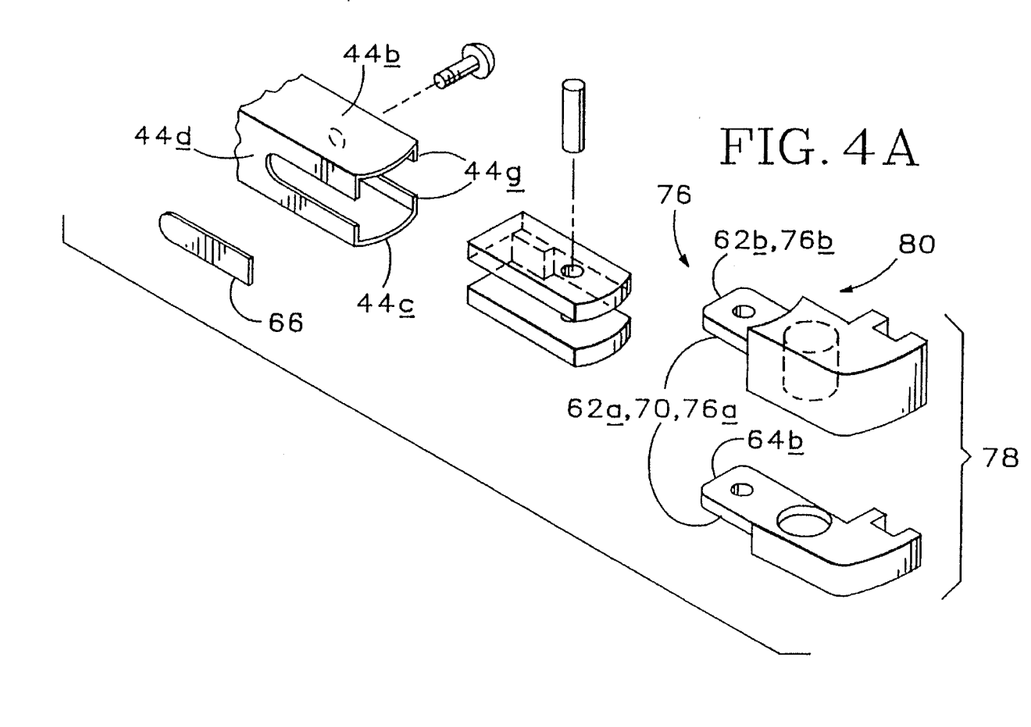

Importantly, and referring now to FIGS. 4 and 4A, invented hinge assemblies 40, 42 include in a forward region of temples 44, 46 corresponding leaf springs 66, 68 that lie nominally in a plane of an inner wall of a corresponding tube such as tubes 48, 50 and that forms a forward, terminal extent thereof. Forward, terminal ends of leaf springs 66, 68 will be understood to be capable of being temporarily deflected outwardly from their nominal position of co-planarity with the outer side walls of tubes 48, 50 by forces exerted thereon by one or more of the fingers of rearwardly projecting members 62, 64 of eyewires 58, 60. As may be seen from FIG. 4, outer expanses 70, 72 of members 62, 64 each define a first generally flat surface region of the projection, e.g. surface region 62a of member 62, that acts as a cam surface followed by the corresponding, resiliently deflectable leaf spring, e.g. leaf spring 66.

The cams and cam followers, which are defined for example by leaf spring 66 formed within temple 44 and region 62a of corresponding projecting member 62 of eyewire 58, are configured to ensure that, when the temples 44, 46 pivotally are overextended such that their rearward extreme ends 44a, 46a are maximally spaced from one another, they are urged or biased to return to a nominally 90° pivotal orientation relative to the plane of eyewires 58, 60.

Preferably, projections 62, 64 further include second flat regions 62b, 64b that each also act as camming surfaces when the eyewear is folded into what will be referred to herein as a stowing condition thereof in which the eyewear is generally flat. In accordance with this feature of the invention, leaf springs 66, 68 act as cam followers to bias or urge temples 44, 46 into such stowing condition, while providing protection for lenses 32, 34 from inadvertent and potentially damaging impact by temple tips, or extreme rearward temple ends, 44a, 46a. Second flat regions 62b, 64b will be understood to be located on projections 62, 64 such that leaf springs 66, 68 lie flat thereagainst in a nominally closed condition of the eyewear in which the temple tips do not touch the corresponding lenses, e.g. EC lenses 34, 32, to which they are closely proximate.

The invention in one broader aspect now may be appreciated to be a pair of eyeglasses including a front piece 72 and a temple, or temple piece, such as temple piece 44 having a top surface 44b, a bottom surface 44c and a leaf spring 66 defining a side surface 44d of the temple piece, with the leaf spring being movable relative to the top and bottom surfaces to bias the temple piece into a predetermined open position indicated in FIG. 4 from an overextended open position, as is known, relative to the front piece.

Preferably, such front piece 72 includes structure 74 for receiving a lens such as lens 32 therein and a cam surface 76 operatively connected with, and projecting rearwardly from, the structure, wherein the temple piece is hingedly connected to the cam surface, as suggested by FIGS. 4 and 4A. Also in accordance with the preferred embodiment, cam surface 76 includes a flat region 76a cooperable with the leaf spring thereby to bias the temple piece into such predetermined open position, also as shown. Finally, it is preferable that cam surface 76 includes a second flat region 76b cooperable with the leaf spring thereby to bias the temple piece into a folded position relative to the front piece.

By another aspect of the invented eyeglasses pair, temple piece 44 further includes a first end 44e hingedly connected to front piece 72 and a second end 44a including a region 44f (refer also to region 46f of temple piece 46) of protective coating to reduce or preferably eliminate lens scratching when the temple piece is in such folded position relative to structure 74. This coating preferably is selectively formed in a distal, or rearward terminal, region of temple piece 44 as by selectively dipping a terminal end of temple piece 44 in a liquid urethane bath. Those of skill in the art will appreciate that such protective coating may be selectively formed to a greater or lesser extent, or may take thicker or thinner forms and may be formed of different materials that provide the desired resilient, non-abrasive protection for the lenses of the eyeglass pair, all within the spirit and scope of the invention.

Another important aspect of the invention focuses on the frame itself. Such an eyeglass frame F as is shown in FIGS. 4 and 4A may be seen to include a front piece 72 including structure 74 for receiving a one or more lenses such as lens 32 therein, with the structure defining a first plane indicated at $P_1$ and with what will be referred to herein as a corner block 78 projecting laterally and rearwardly from the structure; and a temple piece 44 connected to the corner block, with the temple piece including a side wall 44g defining a second plane indicated at $P_2$ and leaf spring 66 defining a forward extension of the side wall such that the leaf spring lies substantially within such second plane. Such a leaf spring-equipped hinged corner assembly in a pair of eyeglasses is readily seen to provide unprecedentedly lightweight, hollow corner and temple piece structure that is compatible with aesthetic and functional demands placed upon not only the invented electrochromic eyewear but also upon conventional eyewear.

Preferably, the invented frame features symmetrically located corner blocks such as corner block 78 (formed as illustrated in upper and lower mating pieces the lower of which will be referred to herein as a rimlock member) including a flat region such as previously described flat region 62a of member 62 cooperable with the leaf spring thereby to bias the temple piece into a predetermined open position relative to the front piece. Preferably, each corner block includes a second flat region such as previously described flat region 62b of member 62 cooperable with the leaf spring thereby to bias the temple piece into a folded position relative to the front piece such that first plane $P_1$ is substantially parallel with second plane $P_2$. Of course, it is typical for the front piece to include one or more lenses positioned within corresponding eyewire regions of structure 74. Thus, it is preferable for the temple piece to include at least an inner region 44f of resilient, e.g. elastomeric, coating positionable adjacent such lens when the temple piece is in a folded position. In this way, the coating prevents damage to the lens(es) that otherwise may be caused by pivoting of the temple piece into a closed, or flat, configuration of the eyewear, e.g. for stowage.

The invented optical frame assembly alternatively may be described as follows, again by reference to FIGS. 4 and 4A. The frame assembly may be seen to include a front piece 72 including structure 74 for receiving a lens such as lens 32 therein, with the structure defining a first plane $P_1$, and a projection 80 attached to, and preferably integrally connected to, the structure and extending outwardly or rearwardly such that the projection 80 extends transversely relative to first plane $P_1$. The frame assembly also may be seen to include a temple member 44 defining a second plane $P_2$, with the temple member including a front region 44e having a side subregion 44g and a rear region 44a, the front region being pivotally mounted to the projection such that the temple member and the front piece define an angle θ therebetween, and such that said temple member is movable between a folded position wherein θ equals approximately 0°, a predetermined open position indicated in FIG. 4 wherein θ equals approximately 90°, and an overextended open position, as is known, wherein θ is greater than 90°.

Front region 44e further may be seen, perhaps best by reference to FIG. 4A, preferably to include a Leaf spring 66 extending within the plane of the side subregion when the temple member is in such predetermined open position or such folded position, with the leaf spring and the projection cooperating to bias the temple member into the illustrated predetermined open position from the illustrated overextended open position. Preferably, projection 80 includes a first flat region such as previously described region 62a of member 62 cooperable with leaf spring 66 thereby to bias the temple piece into such predetermined open position from such overextended open position. Also, preferably projection 80 includes a second flat region such as previously described region 62b of member 62 cooperable with leaf spring 66 thereby to bias the temple piece into such folded position.

From FIG. 4A, those of skill in the art will appreciate that the symmetrically located right-cylindrical recesses formed in the upper and lower pieces of the corner blocks provide for the inclusion in power supply system 10 of further external components such as the external inductor described and illustrated in connection with FIG. 1. Such, it will be appreciated, are interconnected in accordance with invention, via flex circuit 52, suitably modified as needed to accommodate additional signal routing via printed flexible circuit conductors. Those of skill in the art also will appreciate that eyewires 58, 60 may in alternative embodiments preferably are in the form of open loops, as illustrated by the through cut in the lateral, outer regions thereof, to enable removal and insertion of EC lenses 32, 34, with only minimal disassembly of eyewear 38. Modifications to hinge assemblies 40, 42 that further facilitate lens removal and insertion are within the spirit and scope of the invention.

Of course, in accordance with the preferred embodiment of the invented frame assembly, front piece 72 includes a lens positioned within the structure for receiving a lens, whether of the conventional or EC variety, whether prescription or not. As described above, preferably rear region 44a of the temple member includes an illustrated non-abrasive coating to reduce, and to the greatest extent possible to eliminate, lens scratching by the temple member. Those of skill in the art will appreciate that these improvements in eyewear frame assemblies are broadly applicable to conventional eyewear as well as to the invented EC eyewear illustrated herein, as will be described in more detail below.

In the EC eyewear context, the invention in one of its important aspects may be described as a pair of electrochromic eyeglasses including 1) a front piece 72 including two eyewires, or electrochromic-lens-receiving supports, 58, 60 and a hollow bridge 84 connecting the supports, with the supports each including a recess such as recesses 58a, 60a extending around an internal surface of the supports' periphery, with each recess being configured for holding an electrochromic lens such as lenses 32, 34; 2) temple members 44, 46 connected to either side of front piece 72 by a corresponding hinge such as hinge 40, with each temple member including an elongate chamber such as chamber 88 defined within tube 48 for enclosing a battery such as any of those described herein; and 3) a flex circuit assembly 90 (including flex circuit 52 as well as the above-described components mounted thereon) fitted within front piece 72, the circuit assembly including a proximal active-component circuit region 92 (in which such components are mounted) for driving the electrochromic lenses.

Figure 5:
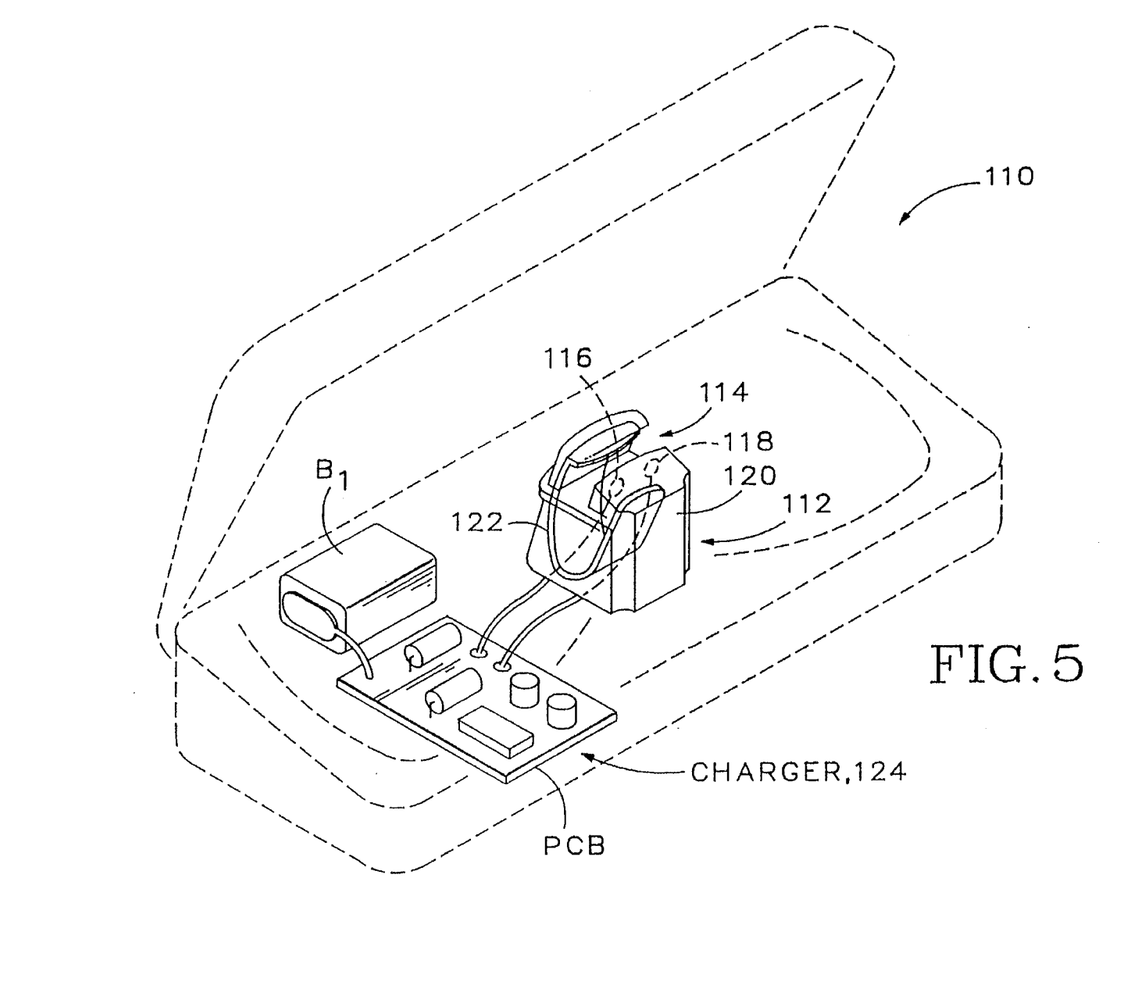
FIG. 5 is an isometric view of an external battery charger case for use with the dual lead acid cell battery configuration.

Preferably, as is suggested by FIG. 5, the circuit assembly includes plural-conductor regions 94, 96 extending from the active-component circuit region in generally opposite directions for routing through the support recesses, around the eyewires for connection with the lenses and switches formed thereabout, through the hinges and at least partway into the chambers for electrical connection of batteries contained therein with the active-component circuit region of the flex circuit assembly. Those of skill in the art will appreciate from FIG. 4 the manner in which illustrated flex circuit 52 in its unfolded form external to front piece 72 and temples 44, 46 in its assembled form has expanses 94, 96 are routed through channels 58a, 60a, through hinge assemblies 40, 42 and endcaps 54, 56 into tubes 48, 50 for connection with primary and secondary batteries 16, 18 to render EC eyewear 38 operative.

Also preferably, flex circuit assembly proximal region 92 is positioned within bridge 84, as described and suggested by the exploded assembly drawing of FIG. 4. It is the form fittability of this proximal, most preferably substantially central, region wherein both integrated and discrete circuit components are interconnected that gives EC eyewear 38 made in accordance with its preferred embodiment its functionality and aesthetics.

With further regard to flex circuit assembly proximal region 92 in which the power supply and controller circuitry is assembled and preferably potted, it will be appreciated that a printed circuit board (PCB), e.g. so-called FR-4, is used in one exemplary embodiment, while it is within the spirit and scope of the invention to mount the circuitry directly to the flex circuit in region 92 by the use of techniques similar to those of known surface mount technology (SMT). The advantage of mounting the circuit components on a PCB and, in turn, mounting the PCB on the flex circuit in region 92—by a process that is analogous to known chip-on-board hybrid circuit fabrication—is design flexibility and adaptability to any one of various battery subsystems that might be available or desirable and ease and low cost of manufacture.

As may be seen from FIG. 4, flex circuit assembly 90 preferably further includes in plural-conductor regions 94, 96 thereof lens-contacting land regions 98, 100 for operative electrical connection with one such electrochromic lens such as lens 32. Those skilled in the art will appreciate that preferably lens-contacting regions 98, 100 are formed of gold-plated copper, thereby to ensure reliable electrical contact and to reduce the tendency of the copper to corrode, especially under humid conditions. Skilled persons also will appreciate that elastomeric conductive strips or pads may be used to great advantage between the lenses' edges and so-called "lens-contacting" regions 98, 100 to provide in this region of electrical contact increased reliability and durability. Such strips are available, for example, from Shin-Etsu Polymer America, Inc. in the form of a "Shin-Flex MAF-Connector", or similar anisotropic connector sheet.

Figure 4B:
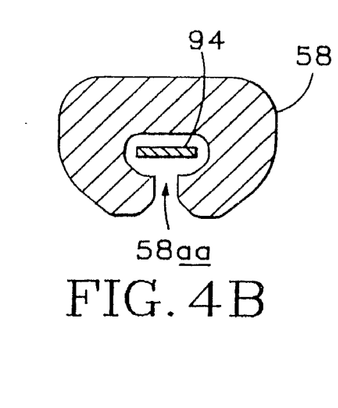
FIGS. 4B and 4C are detailed cross-sectional views of certain inventive aspects of the eyewires shown in FIG. 4.
Figure 4C:
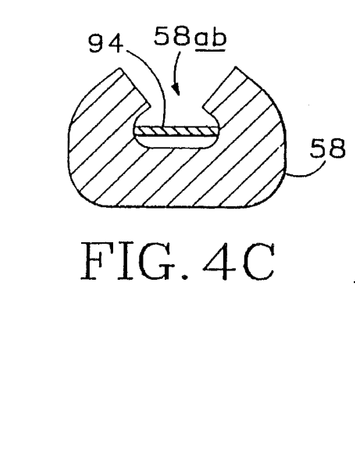

Preferably, each of illustrated recesses 58a, 60a has substantially enclosed lengthwise peripheral regions such as region 58aa of recess 58a (refer momentarily to FIG. 4B) for capturing the flex circuit assembly within such supports, as well as substantially open regions such as region 58ab (refer momentarily to FIG. 4C) interposed the enclosed peripheral regions for providing such electrical contact between lenses positioned within the supports and the land regions of the flex circuit assembly. Such interspersed flex circuit capture and access regions provide reliable electrical contact while rendering EC eyewear 38 easily and inexpensively manufactured.

Referring still to FIG. 4, the laterally spaced manually formable temple tips are provided immediately behind their respective battery tubes 48, 50 to contribute to the formation of the eyewear's temples, indicated at 44, 46. Importantly, in accordance with the preferred embodiment of the invention, the temple tips are coated at least in a rearward, inner region thereof with a non-abrasive, somewhat compliant, e.g. polymeric, material that protects the lenses from wear or damage when temples 44, 46 are folded against, or otherwise inadvertently are made to contact, the lenses. In one embodiment of the invention, such coated regions of temples 44, 46 are formed by dipping at least approximately 3.8 cm (1.5 inches) of the terminal regions thereof in a liquid urethane bath to produce a thin, protective, outer layer that resists abrasive or high-impact contact between the temple tips and the lenses.

Referring more specifically now to invented EC eyewear 38, a flex circuit 52 may be seen to be used to interconnect end caps 54, 56 and their connected batteries with switches S1, S2 and the power supply and controller electronics disposed within a bridge 84 that interposes and connects right and left eyewires 58, 60. Preferably, as shown in FIG. 4, controller electronics including all components shown in FIG. 1 except batteries 16, 18 switches S1, S2, lenses 32, 34 and the distal regions of flex circuit 52 are configured and sized to be contained within bridge 84. In accordance with the preferred embodiment of the invention, it has been demonstrated possible to micro-miniaturize such controller electronics, including relative large inductor L1, and to fix the same in potting compound to form-fit it within the tiny volume, e.g. less than approximately 0.18 ml, of an interior void formed within bridge 84, as will be described in more detail below.

As illustrated in FIG. 4, all remaining components also are miniaturized and formed to fit within voids and channels formed within the frame of eyewear 38. The result is a lightweight, aesthetically pleasing pair of EC eyeglasses compatible with non-prescription as well as prescription EC-coated lenses. The high transmissivity-switching speed and transmissivity range, as well as the durability, achieved in invented lightweight EC eyewear 38 is unprecedented. Importantly, the variety of battery options made possible by the invented cell configurations comprehended by the invented micro-electronic controller renders EC eyewear 38 made in accordance with the invention extremely flexible and adaptable to future developments in microelectronics battery power.

Those skilled in the art will appreciate that relatively low-capacity battery configurations also are accommodated by the invention. For example, an even lighter weight and smaller frame, for persons of smaller build, are possible with the described dual lead acid battery configuration in which the lead acid cells may be made of approximately one-half the length of that shown in FIG. 4. Although such a battery subsystem requires frequent charging, such is made possible by the external battery-charging EC eyewear case that is described below by reference to FIGS. 5 and 6. Such lead acid battery-powered EC eyewear requires periodic, e.g. daily, recharging, which may be accomplished very simply by fitting the assembled eyewear within the case as described and illustrated below. Thus, EC eyewear frames of various weights and sizes will be seen to be within the spirit and scope of the invention.

Importantly, FIG. 4 shows aspects of the invented microelectronic power management system including invented flex switches S1, S2 and invented flex circuit 52. Flex circuit 52 including SMT-mounted circuit components on a tiny FR-4 PCB is employed in accordance with the invention for power and signal distribution in lieu of one or more larger PCBs and wiring harnesses due to the volume restrictions imposed on EC eyewear frames. Similarly, flex switches S1, S2 are employed instead of conventional push-button microswitches so to increase user comfort and convenience in operating the switches to switch the EC lenses between their polar transmissivity states.

Importantly, in accordance with the preferred embodiment of the invention, switches S1, S2 are integrally formed as a part of flex circuit 52, thereby avoiding a mechanical interconnection therebetween and attendant weight and cost increases and a reduction in reliability. Also by the preferred embodiment, switches S1, S2 are configured to be sandwiched between an eyewire and a bevel-flattened edge region (not shown, in FIG. 4, for the sake of clarity and simplicity) of its held lens, preferably in spaced upper regions thereof. While not illustrated in detail in FIG. 4, the detailed structure of switches S1, S2 will be understood preferably to include a post having an enlarged switch-depression end, with the post extending through the holes in frame F of eyewire 58 into enlarged endcaps that act as the externally accessible push buttons that are shown. The holes through which the posts extend may be sealed, if desired, by an O-ring gasket beneath the enlarged push button end of the switches. Operation of the switches to switch the lenses requires only momentary, minimal effort on the part of the wearer by way of relatively light gripping pressure by which the switches individually or collectively, e.g. simultaneously, may be actuated. Thus, switching of the lenses of the EC eyewear requires unambiguously positive contact pressure in one or both of two spaced regions of the frame, e.g. in the vicinity of frame-mounted push buttons 102, 104 but requires little or no thought or effort.

Either one of, and preferably both of, switches S1, S2 then acts in accordance with the invention as an operatively connected switch formed between eyewear frame F and one or both of EC lenses 32, 34, with the connected switch including a first flexible, conductive (e.g. gold-plated copper) expanse such as expanse 102a adjacent frame F and a second flexible conductive expanse such as expanse 102b adjacent the one or both lenses. Such first and second expanses 102a, 102b are pre-formed normally (as by folding them into a lapped position during assembly) to produce a first condition of the connected switch corresponding to a first defined transmissivity of lenses 32, 34 and to produce under manual pressure on frame F a momentary second condition of the switch corresponding to a second defined transmissivity of lenses 32, 34.

As noted, in the preferred embodiment of the invention and for the purpose of positive and unambiguous, intended rather than incidental, actuation thereof, two or more of such lens-connected switches are mounted in frame F, with such two switches being operatively connected (via control logic 28, refer momentarily to FIG. 1) to one or both lenses 32 and 34, wherein each of the switches is formed between eyewear frame F, or more particularly an eyewire such as eyewire 58, and corresponding EC lens such as lens 32, with each of such switches including a first flexible conductive expanse 102a adjacent frame F and a second flexible conductive expanse 102b adjacent the lens.

As may be seen by momentary reference collectively to FIGS. 1 and 4, first and second expanses 102a, 102b preferably are pre-formed (upon assembly of EC eyewear 38) normally to produce a first condition, e.g. open or non-conductive, of each or both of switches S1, S2 corresponding to a first defined transmissivity, e.g. greater than approximately 70%, of fine lens and to produce under manual pressure on, e.g. a push button 102 mounted in, frame F a momentary second condition, e.g. closed or conductive, of each or both of such switches corresponding to a second defined transmissivity, e.g. less than approximately 15%, thereof. Expanses 104a, 104b are similarly formed to produce second push button 104.

As is suggested by FIG. 4, switches S1, S2 disposed within eyewire 58 are operable by manual gripping pressure on frame F, e.g. on eyewire 58 in the vicinity of push buttons 102, 104, in at least two spaced regions of frame F to actuate lens driver 30 via control logic 28 responsive to closure of one or both switches. Each operatively connected switch, in accordance with the preferred embodiment of the invention and by virtue of its implementation as a flex circuit, is responsive to such manual, e.g. push button, pressure optimally believed to be approximately five ounces. Within the spirit and scope of the invention, switches S1, S2 and corresponding push buttons 102, 104 may be located elsewhere in the frame, e.g. in the vicinity of the illustrated corner blocks or on the temples. Also within the invention, switches S1 and S2 may be implemented more conventionally, e.g. electronic, e.g, touch-sensitive, or electro-mechanical, e.g. microswitch, devices may be used.

A mere brush of the wearer's hand in the vicinity of either of switches S1, S2 will not inadvertently actuate them to switch the transmissivity of the EC lenses, while the slightest intended gripping of frame F, e.g. in the vicinity of push buttons 102, 104 reliably will switch the lenses, thereby producing easily but firmly controllable operation of the EC eyewear. Moreover, such pressure as might inadvertently impact on switches S1, S2 in the event that EC eyewear 38 is laid upside-down on a flat surface is insufficient to switch the transmissivity of lenses 32, 34. Accordingly, inadvertent switching is avoided in foreseeable situations.

Each of switches S1, S2 may be seen to include plural, e.g. dual, elongate, flexible circuits or conductor expanses 102a, 102b extending along frame F and around lens 32, with the flexible circuit having pre-formed therein (upon assembly of EC eyewear 38) at least two overlapping conductive termini such as termini 102a, 102b forming the dual contacts of the respective connected switch. Termini 102a, 102b may be seen to be disposed in a first lapped relationship between frame F and lens 32, thereby defining a first, e.g. open, condition of the respective connected switch. On the other hand, termini 102aa, 102ba in a second lapped relationship therebetween with external manual pressure applied will be understood to define a second, e.g. closed, condition of the respective switch, thereby enabling such switching of the transmissivity of the one or more lenses such as lens 32 (via CONTROL LOGIC 28 and LENS DRIVER 30 responsive thereto).

In accordance with the preferred embodiment of the invention, controller 12—including all of internal BATTERY CHARGER 26 (including POWER CONVERTER 22 and CONTROL CIRCUITRY 36), CONTROL LOGIC 28 and LENS DRIVER 30 for driving a pair of EC lenses 32, 34—are integrated into a single integrated circuit (IC) dimensioned to be less than approximately 0.18 mm by 0.28 mm (70 mils by 110 mils). The IC and external discrete components including the variously illustrated resistors and capacitors then are adhered—either directly or on a carrier such as the disclosed tiny PCB—to a proximal, and preferably central region of flex circuit 52. The only non-integrated component of the microcontroller, i.e. inductor L1, is soldered to solder pads provided on the PCB. Controller 12 including its external, integrated passive components and inductor L1 thus is contained within a tiny volume of preferably less than approximately 0.15 ml, more preferably less than approximately 0.10 ml, even more preferably less than approximately 0.05 ml and most preferably less than approximately 0.025 ml, thereby providing extremely high functional density in microelectronic applications such as the illustrative EC eyewear.

Such a tiny volume for the microcontroller described immediately above provides advantages of functional density and low-power efficiency that is unprecedented in microelectronics. Such is fittable within bridge 84 of EC eyewear 38 very simply by potting it into potting compound within the void formed in the eyewear's bridge. A bridge cover (not shown) optionally may be provided to enclose this circuitry within bridge 84. As may be seen from FIG. 4, bridge 84 preferably is provided with dual external electrical contacts 106, 108 for the series-connected dual lead-acid cell, or other suitable rechargeable-cell, batteries of one of the disclosed battery subsystems, for external charging by a battery charging eyewear case now to be described.

Figure 6:
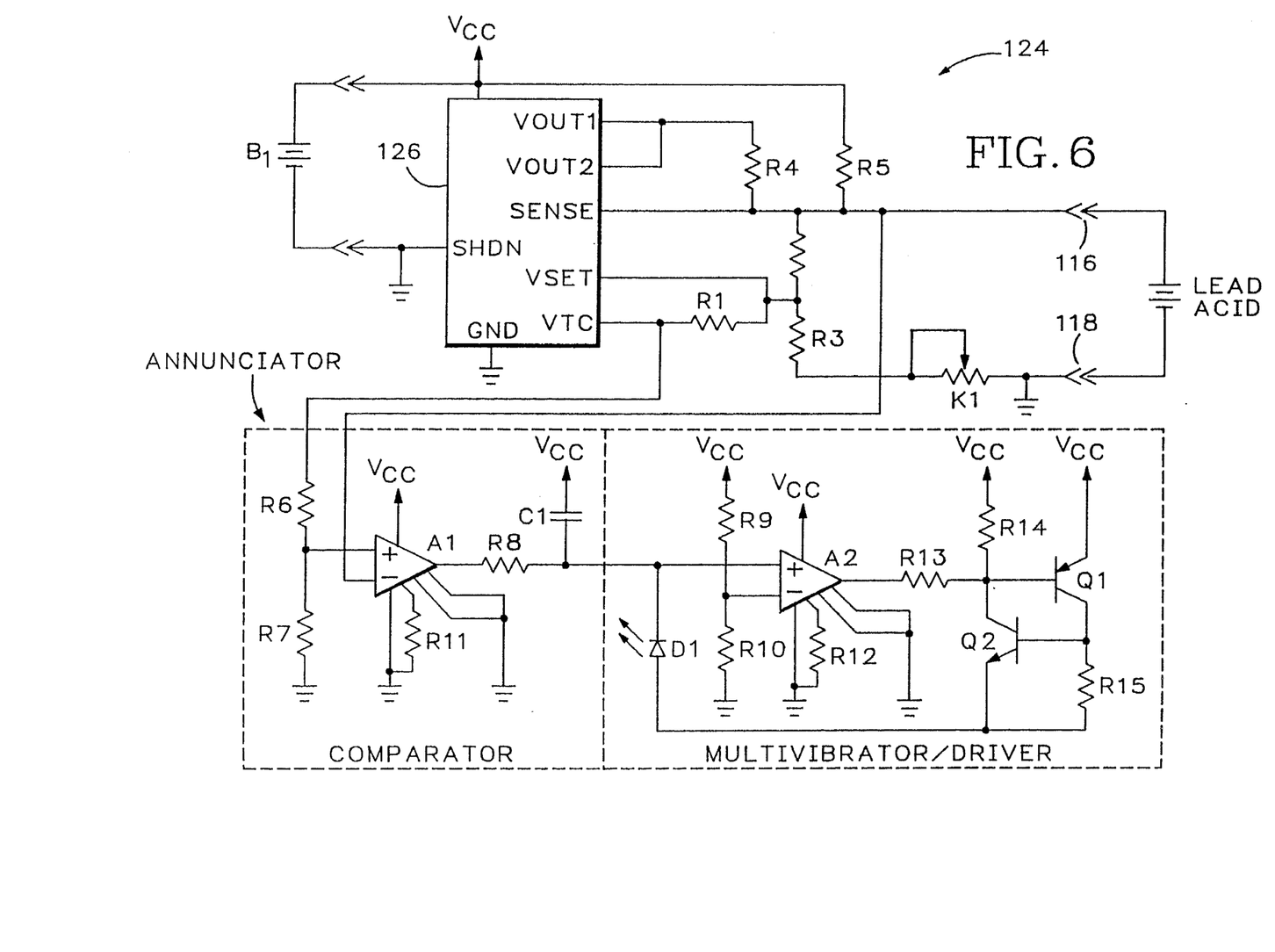
FIG. 6 is a schematic circuit diagram of the external battery charger within the case shown in FIG. 5.

Turning collectively now to FIGS. 5 and 6, it may be seen that FIG. 5 is an isometric view of an eyewear case 110 that securely and protectively cradles and covers eyewear 38' (wherein it will be appreciated that eyewear 38', not shown for the sake of simplicity and clarity, may be identical with eyewear 38 described and illustrated above as being powered by dual lead acid batteries) while charging its batteries. Those skilled in the art will appreciate that case 110 may take any utilitarian and ornamental form, as suggested by its dashed outline. Importantly to this external battery charger aspect of the invention is means by which eyewear 38' is grippingly engaged adjacent its bridge 84 such that its dual batteries, e.g. dual lead acid batteries 16, 18 are charged, without even partial disassembly of eyewear 38' being required.

Preferably, what will be referred to herein as battery contact means or structure indicated at 112 includes mechanical bridge-gripping structure 114 and a pair of electrical contacts or regions 116, 118 configured for matingly electrically engaging corresponding battery circuit contacts or regions 106, 108 of eyewear 38'. Preferably, bridge-gripping structure 114 is formed of a polymer casting 120 into which a generally C-shaped spring clip 122 is insert molded, as shown. Those of skill in the art will appreciate that such bridge-gripping structure may take any of a variety of forms, and may be formed by any suitable means, to provide, within the spirit and scope of the invention, for the secure gripping of bridge 84 of EC eyewear 38'.

Operatively connected to electrical contacts 116, 118 and preferably located within eyewear case 110 is an external battery CHARGER circuit 124 packaged in any suitable form, as by a discrete or integrated circuit (IC) devices interconnected as by use of a PCB powered by a battery $B_1$. It will be appreciated that any suitable electromechanical structure may be provided, within the spirit and scope of the invention.

Referring now specially to FIG. 6, the operation of external battery CHARGER circuit 124 will be described, with the CHARGER portion of the circuit described first. In accordance with the preferred embodiment, a replaceable 9 V battery $B_1$ is connected across the negative SHDN (shutdown) and positive VCC (supply) inputs to a conventional voltage regulator/supply IC 126 such as a ICL7663 (a CMOS programmable "micropower" linear voltage regulator) available from Maxim Integrated Products, Inc. of Sunnyvale, Calif. or from Harris Semiconductor of Melbourne, Fla. Preferably, regulator/supply IC 126 is temperature compensated by connecting the VTC (voltage temperature compensation) input through a resistor R1 to a sense voltage divider comprising resistors R2, R3 and a potentiometer K1. Such establishes, in accordance with a preferred embodiment of the invention, an approximately −25 mV/°C. temperature compensation factor, although of course any suitable setting may be used.

It will be understood from the circuit diagram that series-connected lead acid batteries 16, 18 within eyewear 38' are connected across such voltage divider to the SENSE input of regulator/supply IC 126 when eyewear 38' is placed within case 110. As shown in FIG. 6, the VOUT1 and VOUT2 outputs of regulator/supply IC 126 are connected via a resistor R4 to the sense line, which also is connected to VCC via a resistor R5.

In one preferred embodiment of the invention, preferably precision ($\leq 1\%$) resistors R1, R2 are 2.7 megohm (M$\Omega$) and preferably precision resistor R3 is 1.0 M$\Omega$. In that embodiment, R4 is 470 $\Omega$ and R5, K1 are 100 kilohm (k$\Omega$). Potentiometer K1 will be understood to provide an adjustable float charge voltage between contacts 116, 118 for charging the lead acid batteries within eyewear 38 at a desired current and voltage. The use of a battery $B_1$ renders battery CHARGER within case 110 portable, and the use of a replaceable battery renders the same easily and inexpensively maintained. Those of skill in the art will appreciate that, within the spirit and scope of the invention, different battery charger circuit topologies, and/or alternative component types and values, may be used.

The SENSE input to regulator/supply IC 126, which is connected to the positive one of contacts 116, 118 and thus represents the output, or charging, current line, and with a connected lead acid battery pair thereat also represents the output thereof under load, is connected via resistors R6, R7 as shown to the positive input of a first operational amplifier (op amp) A1. The negative input of first op amp A1 is connected to the VTC input to regulator/supply IC 126. Thus, op amp A1 and its closely associated support circuitry act as a load voltage COMPARATOR to detect when a connected lead acid battery pair presents a load to external battery CHARGER, i.e. to detect when external battery CHARGER is charging the eyewear's lead acid batteries.

The output of first op amp A1 is connected through a filter network comprising a series resistor R8 and VCC-biased capacitor C1 to the positive input of a second op amp A2 the negative input of which is connected via resistor divider comprising resistors R9, R10 between VCC and ground. First and second op amps A1, A2 preferably have their offset adjustment inputs grounded, as indicated in FIG. 6.

Importantly, first and second op amps A1, A2 have their bias current setting inputs grounded via high-resistance resistors R11, R12. The output of second op amp A2 drives the base of a first transistor Q1 via a series resistor R13, the base being biased to VCC via a resistor R14. The collector of first transistor Q1 directly drives the base of a second transistor Q2 and drives the emitter of transistor Q2 via a resistor R15. Transistor Q2's collector is fed back to the base of transistor Q1 and transistor Q2's emitter is connected via a light-emitting diode (LED) D1 to the input of second op amp A2. Persons skilled in the art will appreciate that second op amp A2, transistors Q1, Q2 and LED D1 and their closely associated support circuitry form an extremely low-current monostable MULTIVIBRATOR/DRIVER and cause LED D1 visibly to blink at a desired frequency and duty cycle determined by the values of the surrounding components. COMPARATOR and MULTIVIBRATOR/DRIVER together thus are labelled ANNUNCIATOR in FIG. 6, by which broadly is meant audio, visual or other means of indicating the operational status of CHARGER and/or EC eyewear 38'.

In one exemplary embodiment of the invention, preferably precision resistor R6 is 7.5 MΩ and preferably precision resistor R7 is 1.13 MΩ. In such embodiment, resistor R8 is 430 kΩ and capacitor C1 is 0.47 μF. Resistors R9, R11, R12 are 39 MΩ. R10 is 18 MΩ, R13 is 18 kΩ, R14 is 4.7 kΩ and R15 is 10 kΩ. Op amps A1, A2 preferably are CA3440Ms and transistors Q1, Q2 are 2N3904s. Persons skilled in the art will appreciate that, within the spirit and scope of the invention, different circuit topologies, devices and component values may be used.

It may be seen then that ANNUNCIATOR provides a preferably visible, but ultra-low-current indication to the user of battery charger case 110 that proper contact is made between contacts 116, 118 of case 110 and between corresponding terminals 106, 108 located in bridge 84 of eyewear 38'. LED D1 thus reassures the user that recharging is taking place, and informs the user when recharging is complete. Yet the unique low-power COMPARATOR and MULTIVIBRATOR/DRIVER circuits that collectively form ANNUNCIATOR, as described and illustrated by reference to FIG. 6, does so while drawing, or consuming, current from battery $B_1$ at a level of preferably less than approximately 1 milliampere (mA), more preferably less than approximately 1.00 microamperes (μA) and most preferably only approximately 50 microamperes (μA), each of which represents a tiny fraction of the capacity of battery $B_1$. As a result, battery $B_1$ is virtually untaxed by ANNUNCIATOR so that its energy is used instead substantially solely to recharge the lead acid battery pair within eyewear 38'.

It is estimated that ANNUNCIATOR has the capacity visibly, constantly to blink LED D1 for nearly eight years (subject, of course, to the shelf life of battery $B_1$, which may be only approximately five years). Obviously, with LED D1 blinking typically only when eyewear 38' is properly situated within case 110 for battery charging or recharging, the effective life of ANNUNCIATOR is practically unlimited, and virtually all of the capacity of battery $B_1$ is dedicated to its primary purpose of recharging.

As illustrated and described herein, external battery, or CHARGER circuit, produces up to approximately 1.0 mA of charging current at 2.2–2.4 V (adjusted by setting potentiometer K1) at contacts 116, 118 and is capable of recharging fully depleted lead acid batteries 16, 18 of eyewear 38' in less than approximately eight hours and preferably less than approximately five hours, while producing a visual indication of when it is charging. It is believed that external battery CHARGER circuit would fully recharge depleted lead acid battery pairs within eyewear 38', for more than approximately six months of normal use of eyewear 38' and at normal charging frequency, before replacement of battery $B_1$ were required.

The invention now may be seen to involve an electrochromic eyewear system that includes not only 1) electrochromic eyewear 38' described above but also 2) an external battery charger, e.g. battery CHARGER circuit therefor, with the charger having an electromechanical configuration for conductive electrical connection for charging the eyewear's one or more batteries and a mechanical connection for gripping the eyewear's frame during the charging thereof.

As described and illustrated herein, eyewear 38' preferably includes 1a) an eyewear frame such as frame F; 1b) an electrochromic lens such as lens 32 mounted in the frame, with the lens being capable of switching its visible light transmissivity; 1c) one or more switches such as switches S1, S2 mounted in the frame, with at least one of the switches being operatively connected to the lens, e.g. as illustrated in FIG. 1; and 1d) a power supply such as power supply 10 contained within the frame, with the power supply including a controller such as controller 12, at least one lead acid battery for supplying current to the controller and for supplying switching current through the connected switch to the lens.

Preferably, an external battery charger, or battery CHARGER circuit, also forms a part of such an EC eyewear system. Such an external charger is integrally housed in an eyewear enclosure, or case 110, as illustrated in FIG. 5. Also preferably, the external battery charger is battery operable and thus portable without external connection, for example, to an AC power source or converter. As described above in accordance with the preferred embodiment, battery charger, or battery CHARGER circuit, includes ANNUNCIATOR for communicating to a user when the charger is supplying charging current to the rechargeable batteries of eyewear 38'.

As described and illustrated herein, ANNUNCIATOR preferably is optical and, accordingly, such communicating is visual. Those of skill in the art of course will appreciate that such communicating with a user via an annunciator instead might be aural, as by an intermittent beeper. It also might take different visual forms, e.g. it might include a textual or graphic display for showing the status of the eyewear charging process, e.g. via a bar graph.

Importantly, in accordance with the preferred embodiment of the invention, when battery charger, or battery CHARGER circuit, is battery operable, ANNUNCIATOR is operated intermittently, i.e. at a predetermined frequency and duty cycle, thereby to conserve power on the external battery-operable battery CHARGER.

While the present invention has been shown and described with reference to the foregoing preferred embodiment, it will be apparent to those skilled in the art that other changes in form and detail may be made therein without departing from the spirit and scope of the invention as defined in the appended claims.

We claim:

1. An electrochromic eyewear system comprising:
   electrochromic eyewear including
      an eyewear frame;
      an electrochromic lens mounted in said frame, said lens being capable of switching its visible light transmissivity;
      one or more switches mounted in said frame, at least one of said switches being operatively connected to said lens; and
      a power supply contained within said frame, said power supply including a controller and at least one lead acid battery for supplying current to said controller and for supplying switching current through said connected switch to said lens;

an electrical contact conductively connected to said battery for external charging of said battery, wherein the electrical contact is disposed on the external surface of the eyewear; and an external battery charger for said electrochromic eyewear, said charger having an electro-mechanical configuration for conductive electrical connection to said electrical contact of said eyewear for charging said battery and a mechanical connection for gripping said frame during charging of said battery.

2. The system of claim 1, wherein said external battery charger is integrally housed in an eyewear enclosure.

3. The system of claim 1, wherein said battery charger is battery operable.

4. The system of claim 1, wherein said battery charger includes an annunciator for communicating to a user when said charger is supplying charging current to said batteries of said eyewear.

5. The system of claim 4, wherein said annunciator is optical and such communicating is visual.

6. The system of claim 4, wherein said battery charger is battery operable and wherein said annunciator is operated intermittently to conserve power on said battery-operable battery charger.

7. The system of claim 4 in which said battery charger is portable and includes a battery, wherein said annunciator consumes current from said battery at a level of less than approximately 1 milliampere.

8. The system of claim 7, wherein said annunciator consumes current from said battery at a level of less than approximately 100 microamperes.

9. The system of claim 7, wherein said annunciator consumes current from said battery at a level of less than approximately 50 microamperes.

10. Rechargeable electrochromic eyewear comprising:

an eyewear frame including a pair of electrical contacts disposed on an external surface thereof;

an electrochromic lens mounted in said frame, said lens being capable of switching its visible light transmissivity;

one or more switches mounted in said frame, at least one of said switches being operatively connected to said lens; and a power supply contained within said frame, said power supply including a controller, one or more rechargeable batteries for supplying current to said controller and for supplying switching current through said connected switch to said lens, said batteries being electrically connected with said dual contacts for external recharging of said batteries.

11. An external recharging case for use with rechargeable electrochromic eyewear having a frame and one or more rechargeable batteries contained therein comprising:

a base dimensioned to receive thereon electrochromic eyewear, said base having connected therewith an electro-mechanical interface to such electrochromic eyewear, said interface providing an electrical connection for charging the batteries, said interface further providing a mechanical connection for gripping the frame during the charging of the batteries.

* * * * *